United States Patent
Kang et al.

(10) Patent No.: US 10,280,330 B2
(45) Date of Patent: *May 7, 2019

(54) HARD COATING FILM

(71) Applicant: LG CHEM, LTD., Seoul (KR)

(72) Inventors: Joon-Koo Kang, Daejeon (KR);
Yeong-Rae Chang, Daejeon (KR);
Sung-Don Hong, Daejeon (KR);
Soon-Hwa Jung, Daejeon (KR);
Eun-Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 778 days.

This patent is subject to a terminal disclaimer.

(21) Appl. No.: 14/423,418

(22) PCT Filed: Jul. 29, 2013

(86) PCT No.: PCT/KR2013/006772
§ 371 (c)(1),
(2) Date: Feb. 23, 2015

(87) PCT Pub. No.: WO2014/030844
PCT Pub. Date: Feb. 27, 2014

(65) Prior Publication Data
US 2015/0240109 A1    Aug. 27, 2015

(30) Foreign Application Priority Data

Aug. 23, 2012 (KR) .................. 10-2012-0092527
Jul. 26, 2013 (KR) .................. 10-2013-0089100

(51) Int. Cl.
| | | |
|---|---|---|
| *C09D 151/08* | (2006.01) |
| *C08K 3/36* | (2006.01) |
| *C08L 51/08* | (2006.01) |
| *C09D 7/61* | (2018.01) |
| *C09D 133/04* | (2006.01) |
| *C08L 33/04* | (2006.01) |
| *C09D 5/00* | (2006.01) |
| *C08F 290/02* | (2006.01) |
| *C08F 290/06* | (2006.01) |

(52) U.S. Cl.
CPC .......... *C09D 151/08* (2013.01); *C08F 290/02* (2013.01); *C08F 290/067* (2013.01); *C08K 3/36* (2013.01); *C08L 33/04* (2013.01); *C08L 51/08* (2013.01); *C09D 5/00* (2013.01); *C09D 7/61* (2018.01); *C09D 133/04* (2013.01); *Y10T 428/24917* (2015.01); *Y10T 428/28* (2015.01); *Y10T 428/31935* (2015.04); *Y10T 442/10* (2015.04)

(58) Field of Classification Search
None
See application file for complete search history.

(56) References Cited

U.S. PATENT DOCUMENTS

| | | |
|---|---|---|
| 5,146,531 A | 9/1992 | Shustack |
| 6,489,015 B1 | 12/2002 | Tsuchiya et al. |
| 2004/0081831 A1 | 4/2004 | Shoshi et al. |
| 2005/0136273 A1 | 6/2005 | Hashimoto et al. |
| 2007/0134463 A1* | 6/2007 | Sinha ................ G11B 7/24056 428/64.6 |
| 2007/0178297 A1 | 8/2007 | Takada et al. |
| 2007/0237966 A1 | 10/2007 | Takao et al. |
| 2008/0145673 A1 | 6/2008 | Bonnard |
| 2008/0193722 A1 | 8/2008 | Tanaka |
| 2008/0311351 A1 | 12/2008 | Hsu et al. |
| 2009/0169896 A1 | 7/2009 | Sohn et al. |
| 2009/0202819 A1 | 8/2009 | Asahi et al. |
| 2009/0214871 A1 | 8/2009 | Fukuda et al. |
| 2010/0055377 A1 | 3/2010 | Esaki et al. |
| 2010/0084037 A1 | 4/2010 | Ericsson et al. |
| 2011/0050623 A1 | 3/2011 | Lee et al. |
| 2011/0077334 A1* | 3/2011 | Oi .......................... C08F 220/36 524/264 |
| 2011/0124823 A1* | 5/2011 | Hayashi ................ C08G 18/10 525/424 |
| 2012/0019766 A1 | 1/2012 | Oki et al. |

FOREIGN PATENT DOCUMENTS

| | | |
|---|---|---|
| CN | 1286640 C | 11/2004 |
| CN | 102257087 A | 11/2011 |
| EP | 2397527 A1 | 12/2011 |
| EP | 2 840 109 A1 | 2/2015 |
| EP | 2 840 110 A1 | 2/2015 |
| EP | 2840107 A1 | 2/2015 |
| EP | 2 842 989 A1 | 3/2015 |
| EP | 2843008 A1 | 3/2015 |

(Continued)

OTHER PUBLICATIONS

English Machine translation of Kazuko (JP 2011-201087), EPO, accessed Aug. 22, 2017. (Year: 2011).*
International Search Report and Written Opinion issued in International Application No. PCT/KR2013/006722 dated Oct. 25, 2013.
Supplementary European Search issued in European Patent Application No. 13830608.9 dated Dec. 18, 2015, 7 pages.
Supplementary European Search issued in European Patent Application No. 13830624.6 dated Jan. 29, 2016, 9 pages.
"Ciba TINUVIN 900 Light Stabilizer", Ciba Specialty Chemicals, 1997, pp. 1-3.

(Continued)

*Primary Examiner* — Humera N Sheikh
*Assistant Examiner* — Xiaobei Wang
(74) *Attorney, Agent, or Firm* — Rothwell, Figg, Ernst & Manbeck, P.C.

(57) ABSTRACT

Disclosed herein is a hard coating film, which exhibits high hardness and excellent properties without a supporting substrate. The hard coating film can find useful applications in various fields thanks to its excellent hardness, scratch resistance, transparency, durability, light resistance, light transmittance, and the like.

13 Claims, No Drawings

(56) References Cited

FOREIGN PATENT DOCUMENTS

| | | |
|---|---|---|
| EP | 2 857 440 A1 | 4/2015 |
| JP | 2000-15734 A | 1/2000 |
| JP | 2000-071392 A | 3/2000 |
| JP | 2000-214791 A | 8/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-288787 A | 10/2005 |
| JP | 2006058574 A | 3/2006 |
| JP | 2006-231845 A | 9/2006 |
| JP | 2006-233167 A | 9/2006 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008-116596 A | 5/2008 |
| JP | 2008-129130 A | 6/2008 |
| JP | 2008138165 A | 6/2008 |
| JP | 2008-150484 A | 7/2008 |
| JP | 2008-197662 A | 8/2008 |
| JP | 2008-310286 A | 12/2008 |
| JP | 2009-204727 A | 9/2009 |
| JP | 2009204725 A | 9/2009 |
| JP | 2009-241458 A | 10/2009 |
| JP | 2010-017991 A | 1/2010 |
| JP | 2010-052334 A | 3/2010 |
| JP | 2010-053231 A | 3/2010 |
| JP | 2010121013 A | 6/2010 |
| JP | 2010-173234 A | 8/2010 |
| JP | 2010-284910 A | 12/2010 |
| JP | 2011-031457 A | 2/2011 |
| JP | 2011-031527 A | 2/2011 |
| JP | 2011-504828 A | 2/2011 |
| JP | 2011022456 A | 2/2011 |
| JP | 2011-043606 A | 3/2011 |
| JP | 2011-075705 A | 4/2011 |
| JP | 2011-110902 A | 6/2011 |
| JP | 2011-178910 A | 9/2011 |
| JP | 2011-201087 A | 10/2011 |
| JP | 2011-246548 A | 12/2011 |
| JP | 2012-066477 A | 4/2012 |
| JP | 2012-081742 A | 4/2012 |
| JP | 4911474 B2 | 4/2012 |
| JP | 2013-95108 A | 5/2013 |
| KR | 10-1999-0072670 A | 9/1999 |
| KR | 10-2000-0021805 A | 4/2000 |
| KR | 10-2000-0021806 A | 4/2000 |
| KR | 10-2004-0037081 A | 4/2000 |
| KR | 10-2004-0097189 A | 11/2004 |
| KR | 10-2006-0009194 A | 1/2006 |
| KR | 10-2006-0072072 A | 6/2006 |
| KR | 10-0730414 B1 | 6/2007 |
| KR | 10-2008-0005839 A | 1/2008 |
| KR | 10-2008-0055698 A | 6/2008 |
| KR | 10-0852561 | 8/2008 |
| KR | 10-0852562 | 8/2008 |
| KR | 10-2008-0109658 A | 12/2008 |
| KR | 10-2009-0006131 A | 1/2009 |
| KR | 10-0884079 B1 | 2/2009 |
| KR | 10-2009-0044089 A | 5/2009 |
| KR | 10-2009-0045105 A | 5/2009 |
| KR | 10-2009-0047529 A | 5/2009 |
| KR | 10-2009-0061821 A | 6/2009 |
| KR | 10-2009-0063182 A | 6/2009 |
| KR | 10-2009-0073668 A | 7/2009 |
| KR | 10-0905683 B1 | 7/2009 |
| KR | 10-0926220 B1 | 11/2009 |
| KR | 10-2010-0026014 A | 3/2010 |
| KR | 10-2010-0028648 A | 3/2010 |
| KR | 10-2010-0041992 A | 4/2010 |
| KR | 10-2010-0045997 A | 5/2010 |
| KR | 10-2010-0055160 A | 5/2010 |
| KR | 10-2010-0129512 A | 12/2010 |
| KR | 10-2010-0132786 A | 12/2010 |
| KR | 10-2011-0034324 A | 4/2011 |
| KR | 10-1028463 B1 | 4/2011 |
| KR | 2011-0037622 A | 4/2011 |
| KR | 10-2011-0058743 A | 6/2011 |
| KR | 10-2011-0071480 A | 6/2011 |
| KR | 10-2011-0103885 A | 9/2011 |
| KR | 10-2011-0119704 A | 11/2011 |
| KR | 10-2011-0130142 A | 12/2011 |
| KR | 10-2012-0002366 A | 1/2012 |
| KR | 10-1114932 B1 | 3/2012 |
| KR | 10-1127952 B1 | 3/2012 |
| KR | 10-2012-0058635 A | 6/2012 |
| KR | 10-1150719 B1 | 6/2012 |
| KR | 10-1168073 B1 | 7/2012 |
| KR | 10-2012-0136597 A | 12/2012 |
| KR | 10-1295325 B1 | 8/2013 |
| TW | 200907401 A | 2/2009 |
| TW | 201041985 A | 12/2010 |
| TW | 201130880 A | 9/2011 |
| TW | 201202403 A | 1/2012 |
| TW | I357922 B | 2/2012 |
| WO | 2006046855 A1 | 5/2006 |
| WO | 2006-088200 A1 | 8/2006 |
| WO | 2008-098872 A1 | 8/2008 |
| WO | 2011/105532 A1 | 9/2011 |
| WO | 2012/026475 A1 | 3/2012 |
| WO | 2012/060145 A1 | 5/2012 |

OTHER PUBLICATIONS

Shin-Nakamura Chemical Industry Co., Ltd., [Sep. 20, 2016]-Product List, Photo curable monomers/oligomers: Urethane acrylates with English translation (2 pages).

Third Party Observation dated Oct. 14, 2016 of the corresponding Japanese Patent Application No. 2015-528383 (9 pages).

\* cited by examiner

HARD COATING FILM

CROSS REFERENCE TO RELATED APPLICATIONS

This application is a 35 U.S.C. § 371 National Phase Entry Application from PCT/KR2013/006772, filed on Jul. 29, 2013, and designating the United States, which claims priority under 35 U.S.C. § 119 to Korean Patent Application No. 10-2012-0092527 filed on Aug. 23, 2012, and Korean Patent Application No. 10-2013-0089100 filed on Jul. 26, 2013, which are incorporated herein by reference in their entireties.

BACKGROUND OF THE INVENTION

1. Technical Field

The present invention relates to a hard coating film. More particularly, the present invention relates to a hard coating film, which exhibits high hardness and excellent properties without a supporting substrate.

This application claims the benefit of Korean Patent Application No. 10-2012-0092527, filed on Aug. 23, 2012, and Korean Patent Application No. 10-2013-0089100, filed on Jul. 26, 2013, which are all hereby incorporated by reference in their entireties into this application.

2. Description of the Related Art

With the advance of mobile appliances such as smart phones, tablet PCs and the like, substrates for displays have recently been required to become lighter and slimmer. Display windows or front panels of such mobile appliances are generally made of glass or reinforced glass both of which have excellent mechanical properties. However, glass suffers from the disadvantage of being heavy and being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a hard coating layer.

First of all, increasing the thickness of the hard coating layer is considered as an approach to improving the surface hardness thereof. In fact, the hard coating layer should be of a minimal thickness to ensure the surface hardness of the hard coating layer. As the hard coating layer increases in thickness, the surface hardness thereof may become higher. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, some methods have been proposed for conferring a high hardness on hard coating films, without the problems of cracking and setting shrinkage-induced curling.

Korean Patent Application Publication No. 2010-0041992 discloses a hard coating film composition, free of monomers, comprising a binder resin based on ultraviolet-curable polyurethane acrylate oligomers. However, this hard coating film has a pencil hardness of about 3H, and thus the strength thereof is not sufficient to be a substitute for glass panels for displays.

SUMMARY OF THE INVENTION

Accordingly, the present invention has been devised to solve the above-mentioned problems, and an object of the present invention is to provide a hard coating film, which exhibits high hardness and excellent properties without a supporting substrate.

In accordance with an aspect thereof, the present invention provides a single-layered substrate-less hard coating film, comprising: a photocurable crosslinking copolymer; and inorganic particles dispersed in the photocurable crosslinking copolymer.

The hard coating film of the present invention exhibits high hardness, scratch resistance, impact resistance, transparency without a supporting substrate, and can be usefully applied to mobile appliances, display instruments, and front panels and display windows of various instruments due to its excellent processibility.

DESCRIPTION OF THE PREFERRED EMBODIMENTS

The present invention pertains to a single-layered substrate-less hard coating film, comprising: a photocurable crosslinking copolymer; and inorganic particles dispersed in the photocurable crosslinking copolymer.

As used herein, the words "first" and "second" are employed only to describe various elements, and intended to discriminate one element from another.

All of the terms used in the specification are taken only to illustrate embodiments, and are not intended to limit the present invention. As used herein and in the appended claims, the singular forms "a", "an", and "the" include plural reference unless the context clearly dictates otherwise. Unless the context clearly requires otherwise, throughout the description and the claims, the words "comprise," "comprising," and the like are to be construed in an inclusive sense as opposed to an exclusive or exhaustive sense, that is to say, in the sense of "including, but not limited to."

The above detailed descriptions of embodiments of the invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, the hard coating film of the present invention will be described in detail.

In accordance with an aspect thereof, the present invention provides a single-layered substrate-less hard coating film, comprising: a photocurable crosslinking copolymer; and inorganic particles dispersed in the photocurable crosslinking copolymer.

As used herein, the term "substrate" of "substrate-less" becomes a means for applying a hard coating composition for forming the hard coating layer, and remains in a state in which it is not detached even after the hard coating composition is photocured. Therefore, the term "substrate-less" means that the hard coating film does not include the supporting substrate.

The hard coating film of the present invention, unlike a conventional hard coating film, does not include a supporting substrate. That is, the hard coating film does not include a supporting substrate such as a plastic resin film, which serves to support a hard coating layer and is not detached even after photocuring. Therefore, the hard coating film of the present invention is a substrate-less film.

Further, the hard coating film of the present invention is a single-layered substrate-less film including one hard coating layer. However, it does not exclude possibility to attach another membrane, layer or film onto the hard coating film, and "single-layered" simply means that a hard coating layer formed by photocuring a coating composition is a single layer.

The hard coating film of the present invention has excellent curl properties without curl, warpage or cracking, is thick and flat, and exhibits high hardness, scratch resistance and light transmittance, although it does not include a supporting substrate.

The hard coating film of the present invention includes a photocurable crosslinking copolymer of a photocurable elastic polymer and a tri- to hexa-functional acrylate monomer.

As used herein, the term "acrylate" is intended to encompass acrylate, methancrylate, and derivatives thereof with various substituents.

As used herein, the term "photocurable elastic polymer" refers to a polymer which is of elasticity and contains a functional group that undergoes UV light-triggered crosslink polymerization. According to an embodiment of the present invention, the photocurable elastic polymer may have an elongation of approximately 15% or more, for example, approximately 15 to 200%, approximately 20 to 200%, or approximately 20 to 150%, as measured according to ASTM D638.

The photocurable elastic polymer is crosslink-polymerized with the tri- to hexa-functional acrylate monomer and then photocured to form a hard coating film, conferring flexibility and impact resistance to the hard coating film.

According to an embodiment of the present invention, the photocurable crosslinking copolymer may include 5 to 20 weight parts of the photocurable elastic polymer and 80 to 95 weight parts of the tri- to hexa-functional acrylate monomer based on 100 weight parts thereof. According to the hard coating film of the present invention, the hard coating layer may include the photocurable crosslinking copolymer in which the tri- to hexa-functional acrylate monomer is crosslinked with the photocurable elastic polymer at the above weight ratio, thus conferring high hardness and impact resistance to the hard coating layer without deteriorating other physical properties thereof.

According to an embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may be at least one selected from the group consisting of a polycaprolactone, a urethane acrylate polymer and a polyrotaxane.

Among the polymers used as the photocurable elastic polymer, the polycaprolactone is formed by the ring-opening polymerization of caprolactone, and has excellent physical properties such as flexibility, impact resistance, durability and the like.

Retaining a urethane bond therein, the urethane acrylate polymer has excellent elasticity and durability.

The polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include a rotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

No particular limitations are imposed on the macrocycle if it is large enough to surround the linear moiety. The macrocycle may include a functional group such as a hydroxide group, an amino group, a carboxyl group, a thiol group, an aldehyde group or the like, which can react with other polymers or compounds. Specific examples of the macrocycle may include α-cyclodextrin, β-cyclodextrin, γ-cyclodextrin and mixtures thereof.

Further, the thread may be used without limitation as long as it is generally linear in shape with a predetermined weight or greater. Preferably, a polyalkylene compound or a polylactone compound may be used in the thread. Specifically, a polyoxyalkylene compound including an oxyalkylene repetitive unit of 1 to 8 carbon atoms or a polylactone compound including a lactone repetitive unit of 3 to 10 carbon atoms may be used in the thread.

Meanwhile, the stopper may be appropriately adjusted depending on the characteristics of the rotaxane compound to be prepared. For example, the stopper may be at least one selected from the group consisting of a dinitrophenyl group, a cyclodextrin group, an amantane group, a trilyl group, a fluorescein group and a pyrene group.

Since the polyrotaxane has excellent scratch resistance, it can exhibit self-recovery ability when it is externally damaged and scratched.

According to the hard coating film of the present invention, the hard coating layer containing the photocurable elastic polymer is formed by photocuring, thus allowing the hard coating film to have high hardness and flexibility, particularly ensuring excellent resistance to external impact.

Examples of the tri- to hexa-functional acrylate monomer may include trimethylolpropane triacrylate (TMPTA), trimethylolpropane ethoxytriacrylate (TMPEOTA), glycerin propoxylated triacrylate (GPTA), pentaerythritol tetraacrylate (PETA), and dipentaerythritol hexaacrylate (DPHA). These tri- to hexa-functional acrylate monomers may be used alone or in combination.

The hard coating film of the present invention may include inorganic particles dispersed in the photocurable crosslinking copolymer.

According to an embodiment of the present invention, the inorganic particles may be inorganic nanoparticles having a particle size of about 100 nm or less, about 10 to about 100 nm or about 10 to about 50 nm. For example, silica particles, aluminum oxide particles, titanium oxide particles or zinc oxide particles may be used as the inorganic particles.

The inorganic particles in the hard coating layer make additional contribution to improving the hardness of the hard coating film.

According to an embodiment of the present invention, based on 100 weight parts thereof, the hard coating film may contain the photocurable crosslinking copolymer in an amount of approximately 40 to 90 weight parts and the inorganic microparticles in an amount of approximately 10 to 60 weight parts, or the photocurable crosslinking copolymer in an amount of approximately 50 to 80 weight parts and the inorganic microparticles in an amount of approximately 20 to 50 weight parts. Given the amounts of the photocurable crosslinking copolymer and the inorganic microparticles within the ranges set forth above, the hard coating film can be formed with excellent physical properties.

According to an embodiment of the present invention, the hard coating film may have a thickness of approximately 50

µm or more, for example, approximately 50 to 500 µm. For example, the hard coating film may have a thickness of approximately 50 µm, 75 µm, 100 µm, 125 µm, 188 µm, 200 µm, 250 µm, 300 µm, 450 µm or 500 µm. Since the hard coating film does not include a supporting substrate, the hard coating composition is not influenced by the shrinkage of the supporting substrate, and thus curling or cracking may not occur, thereby forming a thick hard coating film.

Meanwhile, the hard coating film may further include typical additives such as a surfactant, a yellowing inhibitor, a leveling agent, an antifouling agent and the like in addition to the above-mentioned components. Here, the content of the additive may be variously adjusted to the degree that the physical properties of the hard coating film are not degraded. Its content is not particularly limited, but preferably ranges from approximately 0.1 to 10 weight parts, based on 100 weight parts of the photocurable crosslinking copolymer.

According to an embodiment of the present invention, for example, the hard coating film may include a surfactant as an additive. The surfactant may be a mono- or bi-functional fluorine acrylate, a fluorine surfactant, or a silicon surfactant. In this context, the surfactant may be contained in a dispersed or crosslinked form in the photocurable crosslinking copolymer.

Further, a yellowing inhibitor may be used as an additive. The yellowing inhibitor may be a benzophenone compound or a benzotriazole compound.

The hard coating film may be formed by photocuring a hard coating composition including a tri- to hexa-functional acrylate monomer, a photocurable elastic polymer, inorganic particles, a photoinitiator, an organic solvent, and optionally an additive.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

Examples of the organic solvent available in the present invention may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycolmonoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

According to an embodiment of the present invention, for the convenience of transportation, storage, process, usage or the like, the hard coating film may be formed by applying the hard coating composition including the above-mentioned components onto a releasable film and photocuring this composition.

In this case, any method that is available in the art would be used in the application of the hard coating composition without particular limitations. For example, the hard coating composition may be applied by bar coating, knife coating, roll coating, blade coating, die coating, micro-gravure coating, comma coating, slot die coating, lip coating, solution casting or the like.

In this case, the hard coating composition may be applied onto the releasable film to have a thickness of approximately 50 to 500 µm, for example, approximately 50 µm, 75 µm, 100 µm, 125 µm, 188 µm, 200 µm, 250 µm, 300 µm, 450 µm or 500 µm after being completely photocured. According to the present invention, even when the hard coating film is formed to have such a thickness, a high-hardness hard coating film can be prepared without causing curling or cracking.

The releasable film may be used without limitation as long as it is commonly used in the related filed. According to an embodiment of the present invention, examples of the releasable film may include polyolefin-based films, such as a polyester film, a polyethylene film, a polyethylene terephthalate film, a polypropylene film and the like; and teflon-based films. Preferably, the releasable film may be a film release-treated with silicon or acryl silicon such that the releasable film can be easily detached.

The releasable film may be removed after photocuring the hard coating composition, or may not be removed even after photocuring the hard coating composition for the convenience of transportation and storage.

Next, the applied hard coating composition is photocured under UV light to form a hard coating film.

UV radiation may be emitted at a dose of approximately 20 to 600 mJ/cm$^2$ or approximately 50 to 500 mJ/cm$^2$. Any light source that is used in the art would be applied to the present invention without particular limitation. For example, a high-pressure mercury lamp, a metal halide lamp, a black light fluorescent lamp or the like may be used. The photocuring may be carried out by irradiating UV light at the dose for 30 sec to 15 min, or for 1 to 10 min.

Generally, an acrylate-based binder monomer may cause a curing shrinkage phenomenon or curl phenomenon in which a supporting substrate is rolled up together with a coating layer due to shrinkage attributable to curing. The curl phenomenon is a phenomenon in which the edge or the like of a planar film is curvilinearly warped or rolled up when the planar film is spread on a flat plate, and this curl phenomenon occurs when an acrylate-based binder monomer is shrunk in the procedure of photocuring this acrylate-based binder monomer by ultraviolet irradiation.

Particularly, in order to use a hard coating film in covers for mobile terminals such as smart phones or covers for tablet PCs, it is important that the hardness of a hard coating film is improved to such a degree that the hard coating film replaces glass. In this case, in order to improve the hardness of the hard coating film, basically, the thickness of a hard coating layer must be increased to predetermined thickness, for example, 50 µm or more. However, as the thickness of the hard coating layer is increased, the curl phenomenon caused by curing shrinkage is also increased, so the adhesion of the hard coating layer to the supporting substrate is decreased, and the hard coating film is easily rolled up. For this reason, it is not easy to prepare a hard coating film having high hardness that can replace glass without deteriorating the physical properties thereof.

According to the hard coating film of the present invention, since the hard coating film is formed by applying the hard coating composition onto the releasable film, which is not influence by the shrinkage of a supporting substrate, without using a supporting substrate and then photocuring this hard coating composition, curling or cracking may not occur, thus forming the hard coating film to a thickness of 50 μm or more, for example, 50 to 500 μm. Further, even though a supporting substrate is not used, a high-hardness hard coating film can be prepared without deteriorating the physical properties thereof such as hardness, impact resistance and the like.

When the hard coating film is completely photocured and then the releasable film is detached, a single-layered hard coating film is formed without a supporting substrate.

According to an embodiment of the present invention, the hard coating film may further include at least one selected from the group consisting of a plastic resin film, an adhesive film, an releasable film, an electrically conductive film, an electrically conductive layer, a curable resin layer, a non-conductive film, a metal mesh layer, and a patterned metal layer, each of which is attached to one side thereof. The hard coating film of the present invention can be usefully used in various fields thanks to its excellent hardness, scratch resistance, transparency, durability, light resistance and light transmittance.

The impact resistance of the hard coating film is high enough to be a substitute for glass. For example, the hard coating film of the present invention may not crack even after a steel bead weighing 22 g is freely dropped ten times from a height of 50 cm thereto.

For example, according to an embodiment of the present invention, when the hard coating film of the present invention is disposed on a plane after exposure to a temperature of 50° C. or higher at a humidity of 80% or higher for 70 hrs, the maximum distance at which each edge or side of the hard coating film is spaced apart from the plane may be about 1.0 mm or less, about 0.6 mm or less, or about 0.3 mm or less. More particularly, when the hard coating film of the present invention is disposed on a plane after exposure to a temperature of 50° C. to 90° C. at a humidity of 80% to 90% for 70 to 100 hrs, each edge or side of the hard coating film is spaced apart from the plane by about 1.0 mm or less, about 0.6 mm or less, or about 0.3 mm or less, maximally.

Further, the hard coating film of the present invention may have a pencil hardness of 7H or more, 8H or more or 9H or more at a load of 1 kg.

Further, the hard coating film of the present invention may allow two or less scratches to appear thereon after it is doubly rubbed 400 times with a steel wool #0000 under a load of 500 g.

Further, the hard coating film of the present invention may have a light transmittance of 91.0% or more or 92.0% or more and a haze of 1.0 or less, 0.5 or less or 0.4 or less.

Further, the hard coating film of the present invention may have an initial color b* value of 1.0 or less. Further, in the hard coating film of the present invention, the difference between the initial color b* value and a color b* value after exposure to UV B for 72 hrs may be 0.5 or less or 0.4 or less.

As such, the hard coating film of the present invention has useful applications in various fields. For example, the hard coating film of the present invention can be used in the touch panels of mobile terminals, smart phones or tablet PCs, and as covers or device panels for various displays.

A better understanding of the present invention may be obtained through the following examples which are set forth to illustrate, but are not to be construed as limiting the present invention.

EXAMPLES

Preparation Example 1: Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether, and 315 g of methyl ethyl ketone. Then, the mixture was reacted at 70° C. for 5 hrs to obtain polyrotaxane in which polylactone with an acrylate moiety conjugated to the end thereof acted as the macrocycle while cyclodextrin was positioned as the stopper.

The polyrotaxane had a weight average molecular weight of 600,000 g/mol, and was found to have an elongation of 20%, as measured according to ASTM D638.

Example 1

A hard coating composition was prepared by mixing 9 g of a silica-dipentaerythritolhexacrylate (DPHA) composite in which silica nanoparticles with a particle size of 20~30 nm were dispersed by 40 wt % (silica 3.6 g, DPHA 5.4 g), 1 g of the polyrotaxane of Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430) and 1 g of methylethylketone.

The hard coating composition was applied onto a silicon-treated PET film 100 μm thick with a size of 15 cm×20 cm, and then subjected to photocuring by exposure to 280~350 nm UV light from a black light fluorescence lamp to prepare a hard coating film.

After completion of the photocuring of the hard coating composition, the PET film was detached from the hard coating film. The thickness of the hard coating film, from which the PET Film had been detached, was 188 μm.

Example 2

A hard coating film was prepared in the same manner as in Example 1, with the exception that 1 g of a urethane acrylate polymer (brand name: UA200PA, Shinnakamura Chemicals Corp., weight average molecular weight: 2,600 g/mol, elongation measured according to ASTM D638: 170%) was used, instead of 1 g of the polyrotaxane of Preparation Example 1 in the hard coating composition.

Example 3

A hard coating film was prepared in the same manner as in Example 1, with the exception that 1 g of a urethane acrylate polymer (brand name: UA340P, Shinnakamura Chemicals Corp., weight average molecular weight: 13,000 g/mol, elongation measured according to ASTM D638: 150%) was used, instead of 1 g of the polyrotaxane of Preparation Example 1 in the hard coating composition.

Example 4

A hard coating film was prepared in the same manner as in Example 1, with the exception that the thickness of the hard coating film was 250 µm.

Example 5

A hard coating film was prepared in the same manner as in Example 1, with the exception that the thickness of the hard coating film was 300 µm after completion of photocuring of the hard coating composition in Example 1.

Example 6

A hard coating film was prepared in the same manner as in Example 1, with the exception that the thickness of the hard coating film was 450 µm after completion of photocuring of the hard coating composition in Example 1.

Comparative Example 1

A hard coating composition was prepared by mixing 10 g of a silica-dipentaerythritolhexacrylate (DPHA) composite in which silica nanoparticles with a particle size of 20~30 nm were dispersed by 40 wt % (silica 4 g, DPHA 6 g), 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430) and 1 g of methylethylketone.

The hard coating composition was applied onto a silicon-treated PET film 100 µm thick with a size of 15 cm×20 cm, and then subjected to photocuring by exposure to 280~350 nm UV light from a black light fluorescence lamp to prepare a hard coating film.

After completion of the photocuring of the hard coating composition, the PET film was detached from the hard coating film. The thickness of the hard coating film, from which the PET Film had been detached, was 188 µm.

The major components and thicknesses of the hard coating films of Examples 1 to 6 and Comparative Example 1 are summarized in Table 1 below.

TABLE 1

| | Acrylate monomer | Photocurable elastic polymer | Inorganic particles | Thickness |
|---|---|---|---|---|
| Ex. 1 | DPHA 5.4 g | polyrotaxane 1 g | 3.6 g | 188 µm |
| Ex. 2 | DPHA 5.4 g | UA200PA 1 g | 3.6 g | 188 µm |
| Ex. 3 | DPHA 5.4 g | UA340P 1 g | 3.6 g | 188 µm |
| Ex. 4 | DPHA 5.4 g | polyrotaxane 1 g | 3.6 g | 250 µm |
| Ex. 5 | DPHA 5.4 g | polyrotaxane 1 g | 3.6 g | 300 µm |
| Ex. 6 | DPHA 5.4 g | polyrotaxane 1 g | 3.6 g | 450 µm |
| C. Ex. 1 | DPHA 6 g | — | 4 g | 188 µm |

Test Examples

Measuring Method
1) Pencil Hardness

Pencil hardness was evaluated according to the Japanese Standard JIS K5400. In this regard, the hard coating film was doubly rubbed three times with a pencil hardness meter under a load of 1.0 kg to determine the hardness at which no scratches appeared.

2) Scratch Resistance

The hard coating film was doubly rubbed 400 times with a steel wool (#0000) under a load of 0.5 kg in a friction tester, and scratches thus formed were counted. Evaluation was made of the scratch resistance of the films by marking ◯ for two or less scratches, Δ for two to less than five scratches, and x for five or more scratches.

3) Light Resistance

Differences in color b* value of the hard coating films were measured before and after exposure to UVB from UV lamp for 72 hrs.

4) Transmittance and Haze

The hard coating films were measured for transmittance and haze using a spectrophotometer (brand name: CHO-400).

5) Curl Property at High Humidity and Temperature

After a hard coating film piece with dimensions of 10 cm×10 cm was stored for 72 hrs in a chamber maintained at a temperature of 85° C. and a humidity of 85%, it was placed on a flat plane. A maximal distance at which each edge of the piece was spaced apart from the plane was measured.

6) Cylindrical Bending Test

Each of the hard coating films was wound on a cylindrical mandrel having a diameter of 3 cm. When the hard coating film was not cracked, it was evaluated as OK. If the hard coating film was cracked, it was evaluated as X.

7) Impact Resistance

The impact resistance of each of the hard coating films was evaluated by determining whether or not each of the hard coating films was cracked when a 22 g steel ball was freely dropped 10 times thereon from a height of 50 cm. Each of the hard coating films was evaluated as OK when it was not cracked, and as X when cracked.

The results of the physical properties measured in each of the hard coating films are summarized in Table 2 below.

TABLE 2

| | Ex. 1 | Ex. 2 | Ex. 3 | Ex. 4 | Ex. 5 | Ex. 6 | C. Ex. 1 |
|---|---|---|---|---|---|---|---|
| Pencil hardness | 8H | 9H | 8H | 9H | 9H | 9H | 9H |
| Scratch resistance | ◯ | ◯ | ◯ | ◯ | ◯ | ◯ | ◯ |
| Light resistance | 0.10 | 0.12 | 0.11 | 0.18 | 0.23 | 0.36 | 0.20 |
| Transmittance | 93.1 | 92.8 | 92.7 | 92.8 | 92.4 | 92.1 | 93.0 |
| Haze | 0.2 | 0.3 | 0.3 | 0.4 | 0.4 | 0.4 | 0.2 |
| Bending test | OK | OK | OK | OK | OK | OK | X |
| Curl property at high humidity & temperature | 0.0 mm | 0.0 mm | 0.0 mm | 0.0 mm | 0.0 mm | 0.0 mm | 0.0 mm |
| Impact resistance | OK | OK | OK | OK | OK | OK | X |

As shown in Table 2 above, it can be ascertained that all of the hard coating films of Examples exhibited good physical properties. In contrast, the hard coating film of Comparative Example 1, which does not include a photocurable elastic polymer, was found to be insufficient in impact resistance.

What is claimed is:

1. A single-layered substrate-less hard coating film, comprising:
   a photocurable crosslinking copolymer; and
   inorganic particles dispersed in the photocurable crosslinking copolymer,
   wherein the photocurable crosslinking copolymer is a copolymer in which a tri- to hexa-functional acrylate monomer is crosslinked with a photocurable elastic polymer, and the photocurable crosslinking copolymer includes 5 to 20 weight parts of the photocurable elastic polymer and 80 to 95 weight parts of the tri- to hexa-functional acrylate monomer based on 100 weight parts thereof, wherein the photocurable elastic polymer comprises a polyrotaxane, wherein the polyrotaxane comprises a cyclic moiety (macrocycle) in which lactone compounds with a (meth)acrylate moiety conjugated to the end thereof are bonded to each other; a thread moiety held within the macrocycle; and stoppers provided at both ends of the thread moiety so as to prevent dissociation of the macrocycle, and wherein the hard coating film exhibits a pencil hardness of 7H or more at a load of 1 kg.

2. The hard coating film of claim 1, wherein the photocurable elastic polymer has an elongation of 15 to 200%, as measured according to ASTM D638.

3. The hard coating film of claim 1, wherein the hard coating film includes 40 to 90 weight parts of the photocurable crosslinking copolymer and 10 to 60 weight parts of the inorganic particles, based on 100 weight parts thereof.

4. The hard coating film of claim 1, wherein the inorganic particles have a particle diameter of 100 nm or less.

5. The hard coating film of claim 1, wherein the inorganic particles include at least one selected from the group consisting of silica nanoparticles, aluminum oxide nanoparticles, titanium oxide nanoparticles and zinc oxide nanoparticles.

6. The hard coating film of claim 1, wherein the tri- to hexa-functional acrylate monomer includes at least one selected from the group consisting of trimethylolpropane triacrylate (TMPTA), trimethylolpropane ethoxytriacrylate (TMPEOTA), glycerin propoxylated triacrylate (GPTA), pentaerythritol tetraacrylate (PETA), and dipentaerythritol hexaacrylate (DPHA).

7. The hard coating film of claim 1, wherein the hard coating film does not crack when a 22 g steel ball is freely dropped 10 times thereon from a height of 50 cm.

8. The hard coating film of claim 1, wherein the hard coating film allows two or less scratches to appear thereon after it is doubly rubbed 400 times with a steel wool #0000 under a load of 500 g.

9. The hard coating film of claim 1, having a light transmittance of 91% or more, a haze of 0.4 or less and a color b* value of 1.0 or less.

10. The hard coating film of claim 1, the difference between an initial color b* value and a color b* value after exposure to UV B for 72 hrs is 0.5 or less.

11. The hard coating film of claim 1, wherein the hard coating film has a thickness of 50 to 500 μm.

12. The hard coating film of claim 1, wherein when the hard coating film is disposed on a plane after exposure to a temperature of 50° C. or more at a humidity of 80% or more for 70 hrs or more, each edge or side of the hard coating film is spaced apart from the plane by 1.0 mm or less, maximally.

13. The hard coating film of claim 1, further comprising at least one selected from the group consisting of a plastic resin film, an adhesive film, a releasable film, an electrically conductive film, an electrically conductive layer, a curable resin layer, a non-conductive film, a metal mesh layer, and a patterned metal layer, each of which is attached to one side thereof.

* * * * *